(12) United States Patent
Naidu

(10) Patent No.: US 6,362,586 B1
(45) Date of Patent: Mar. 26, 2002

(54) METHOD AND DEVICE FOR OPTIMAL TORQUE CONTROL OF A PERMANENT MAGNET SYNCHRONOUS MOTOR OVER AN EXTENDED SPEED RANGE

(75) Inventor: Malakondaiah Naidu, Troy, MI (US)

(73) Assignees: General Motors Corporation, Detroit; Delphi Technologies, Inc., Troy, both of MI (US)

( * ) Notice: Subject to any disclaimer, the term of this patent is extended or adjusted under 35 U.S.C. 154(b) by 0 days.

(21) Appl. No.: 09/706,139

(22) Filed: Sep. 15, 2000

(51) Int. Cl.$^7$ .................................................. H02P 7/36
(52) U.S. Cl. ...................... 318/432; 318/700; 318/809; 318/811; 318/799
(58) Field of Search .................................. 318/799, 700, 318/801, 432, 439, 802, 721, 809, 811

(56) References Cited

U.S. PATENT DOCUMENTS

| | | | | |
|---|---|---|---|---|
| 5,038,092 A | * | 8/1991 | Asano et al. ................ | 318/811 |
| 5,144,564 A | | 9/1992 | Naidu et al. ................. | 364/494 |
| 5,796,228 A | * | 8/1998 | Kojima et al. ............... | 318/605 |
| 5,801,508 A | * | 9/1998 | Obayashi ..................... | 318/801 |
| 5,903,128 A | * | 5/1999 | Sakakibara et al. ......... | 318/721 |
| 5,920,161 A | * | 7/1999 | Obara et al. ................. | 318/139 |
| 6,188,196 B1 | * | 2/2001 | Koide et al. ................. | 318/700 |
| 6,255,798 B1 | * | 7/2001 | Obara et al. ................. | 318/802 |

* cited by examiner

Primary Examiner—Robert E. Nappi
Assistant Examiner—Rita Leykin
(74) Attorney, Agent, or Firm—George A. Grove; Jeffrey A. Sedlar

(57) ABSTRACT

A method and device for controlling the torque of a permanent magnet (PM), synchronous, alternating-current (AC) motor, wherein the motor is powered by an inverter connected to a direct-current (DC) power source, is proposed. The method includes the steps of communicating a torque command signal from a user to a microcontroller, sensing the alternating-current phase currents of the motor and communicating electrical signals representing data concerning the phase currents to the microcontroller, sensing the position of the rotor of the motor and communicating electrical signals representing data concerning the position of the rotor to the microcontroller, and utilizing the microcontroller to implement a modulation technique to generate electrical switching signals for creating electrical sinusoidal waveforms. In addition, the method also includes the step of utilizing the microcontroller to implement a vector control technique to generate electrical control signals for adjusting the frequency and magnitude of the sinusoidal waveforms according to the phase current data, the rotor position data, the voltage supplied by the power source, and the torque command signal. In this particular step, generating the control signals includes the step of referring to look-up tables in an electronic memory only when operating the motor in a constant torque mode. Lastly, the method also includes the step of utilizing the microcontroller to communicate the switching signals for creating sinusoidal waveforms to the inverter. In this way, the inverter is able to generate and transmit sinusoidal waveforms, as dictated by the switching signals, to the motor for optimal torque control.

22 Claims, 3 Drawing Sheets

METHOD AND DEVICE FOR OPTIMAL TORQUE CONTROL OF A PERMANENT MAGNET SYNCHRONOUS MOTOR OVER AN EXTENDED SPEED RANGE

TECHNICAL FIELD

The present invention relates to a method and an electronic microcontroller unit for controlling the torque of a permanent magnet (PM), synchronous, alternating-current (AC) motor over an extended speed range, wherein the method and the microcontroller unit are both suitable for controlling the motor of an electric vehicle.

BACKGROUND OF THE INVENTION

Recent developmental advances in high-energy batteries, combined with the development of smaller and more powerful motors, have made it possible for new technological and commercial markets to open for a wide range of products, including, for example, portable electric appliances, electric entertainment equipment, and electric vehicles. With particular regard to electric vehicles, improved electric motor drives have also been made possible by the development of solid-state devices such as the MOSFET (metal-oxide-semiconductor field-effect transistor) and the IGBT (insulated-gate bipolar junction transistor), for each of such devices has the capacity for switching and delivering a significant amount of electrical power to a motor. In light of such, along with recent increases in energy costs, energy conservation concerns, environmental concerns, and strict legislation requiring improved internal combustion engine (ICE) efficiency, the motor vehicle industry is pressing for the development of improved electronic motor controls for electric vehicles.

The basic premise on which electronic motor control is based is that the speed, torque, and direction of a motor are all controlled by electronically switching or modulating phase currents and voltages which are ultimately transmitted to the motor. In a closed-loop, electronic motor drive and control system for a synchronous, three-phase, alternating-current (AC) motor, for example, the basic elements of such a system may include: (1) the AC motor, (2) a direct-current (DC) battery (or battery pack), (3) a DC-to-AC inverter, (4) a user command signal device, (5) current sensors, (6) a rotor position sensor, and (7) a microcontroller or microprocessor unit.

In such a system, the user command device is connected to the microcontroller unit and thereby enables a user (that is, the vehicle operator) to select a desired speed or torque at which the motor is to operate. The current sensors are utilized for sensing the phase currents of the motor so that the microcontroller unit can process the currents for feedback control purposes. Similarly, the rotor position sensor is utilized for sensing the position of the rotor of the motor so that the microcontroller unit can instantaneously determine the position and/or speed of the rotor for feedback control purposes as well.

Further in such a system, the DC battery defines a DC power bus which is connected to the inverter, and the inverter is connected to the AC motor. The inverter serves to convert the DC power from the battery into three sinusoidal (AC) phase current signals ($i_a$, $i_b$, $i_c$) which are transmitted to the stator of the motor to thereby operate the motor and control the torque. The inverter includes three drivers wherein each driver is dedicated to driving one of the three AC phase currents. Each driver has two power switches, one "top" switch for driving a particular phase current high and another "bottom" switch for driving the same phase current low. Thus, the three drivers of the inverter have a combined total number of six power switches. Common designations for these six power switches are A_TOP, A_BOT, B_TOP, B_BOT, C_TOP, and C_BOT. The individual conductive states ("on" or "off") of the six power switches dictate both the frequency and the magnitude of the three phase currents which are transmitted to the motor. The inverter receives electrical switching signals from the microcontroller unit which dictate the conductive states of the six power switches at any given point in time.

In general, to properly control the motor, the microcontroller unit must perform two primary tasks. One, the microcontroller unit must generate switching signals for helping the inverter create sinusoidal waveforms for the motor. To accomplish this, the microcontroller unit must implement a "modulation technique." There are many different types of modulation techniques, some of which include, for example, sinusoidal pulse-width modulation (PWM), third-harmonic PWM, 60° PWM, and space vector modulation (SVM). Two, the microcontroller unit must generate electrical control signals for adjusting the frequency and magnitude of the sinusoidal waveforms. To accomplish this, the microcontroller must implement a "control algorithm." Although there are many general types of control algorithms, such as, for example, open-loop volts-per-hertz control, volts-per-hertz with DC current sensing control, direct or indirect vector control (field orientation), and sensorless vector control, a significant number of torque control motor drives implement an indirect "vector control technique." In such a technique, both the phase currents and the rotor position/speed of the motor are sensed to establish closed-loop, feedback control of the motor.

In a vector control technique, electrical signals representing data concerning the sensed phase currents are communicated to the microcontroller unit from the current sensors. In addition, electrical signals representing data concerning the position of the rotor are also communicated to the microcontroller unit from the rotor position sensor. Based on such communicated data, the microcontroller unit then mathematically "maps" the measured phase currents as a stator current vector ($I_a$) onto a two-axis (direct axis "d," quadrature axis "q") coordinate system for the purpose of achieving feedback control. In such a d-q coordinate system, the stator current vector is broken down into two current components, $I_d$ and $I_q$, which are orthogonal to each other on the coordinate system. The $I_d$ current component is used to represent and control the flux of the motor, and the $I_q$ current component is used to represent and control the torque of the motor. If the d-q coordinate system is then mathematically "rotated" synchronously with the rotor flux of the motor, both $I_d$ and $I_q$ can then be treated and controlled as DC values, and the AC motor can thus be controlled almost as if it were a DC motor. Thus, in this way, independent and decoupled control of both the flux and the torque of the motor is achieved.

In addition to sensing the phase currents and rotor position to generate values for $I_d$ and $I_q$, the microcontroller unit must further implement the vector control technique to also generate a desired value for a first (direct-axis) command current variable ($I_d^*$) and a desired value for a second (quadrature-axis) command current variable ($I_q^*$). Generated values for the first command current variable and the second command current variable are ideal values which are most desired and preferred and are used for controlling and operating the motor. These generated values are based on and derived from, for example, the sensed rotor position/ speed data, the voltage supplied by the DC battery, and a user command signal, all of which are electrically communicated to the microcontroller unit. In ultimately generating the values based on such communicated information, the microcontroller unit must typically be involved in very complex and time-consuming processing.

Once both the "measured" $I_d$ and $I_q$ values and the "preferred" $I_d^*$ and $I_q^*$ values are successfully determined and generated, the microcontroller unit then typically utilizes a "current controller" to compare the measured and preferred values. The current controller is basically an implementation of difference equations. Based on the comparison, the current controller then generates electrical control signals, sometimes referred to as "adjustment" or "correction signals," which are used to help conform future "measured" $I_d$ and $I_q$ values with the "preferred" $I_d^*$ and $I_q^*$ values. To accomplish such, the control signals generated by the current controller are subsequently and actively utilized by the microcontroller unit during implementation of the modulation technique.

As briefly alluded to earlier herein, during implementation of the modulation technique, the microcontroller unit generates electrical switching signals which serve to dictate the conductive states of the six power switches of the inverter. In this way, the modulation technique helps the inverter create and modulate sinusoidal waveforms (the phase currents) for ultimate transmittal to the motor. The control signals generated during implementation of the vector control technique are utilized by the microcontroller unit during implementation of the modulation technique to adjust the frequency and magnitude of the sinusoidal waveforms generated by the inverter. By adjusting the frequency and magnitude of the sinusoidal waveforms transmitted to the motor in this manner, feedback control of both the flux and torque of the motor is thereby achieved.

At the present time, many AC motor feedback control systems implement modulation techniques and/or control algorithms which require very complex computations, long processing times, numerous look-up tables, and excessive processing and memory space on a microcontroller or microprocessor. As a result, such motor control systems are typically very costly. Thus, there is a present need in the art for a lower-cost motor control method and/or device which will provide optimal torque control for an AC motor, preferably over an extended speed range, with minimal computational complexity and minimal processing time.

SUMMARY OF THE INVENTION

The present invention provides a method for controlling the torque of a permanent magnet (PM), synchronous, alternating-current (AC) motor suitable for an electric vehicle. The motor is powered by an inverter connected to a direct-current (DC) power source, such as a battery. According to the present invention, the method basically includes the steps of communicating a torque command signal from a user to a microcontroller, sensing the alternating-current phase currents of the motor and communicating electrical signals representing data concerning the phase currents to the microcontroller, sensing the position of the rotor of the motor and communicating electrical signals representing data concerning the position of the rotor to the microcontroller, and utilizing the microcontroller to implement a modulation technique to generate electrical switching signals for creating electrical sinusoidal waveforms. In addition, the method also basically includes the step of utilizing the microcontroller to implement a vector control technique to generate electrical control signals for adjusting the frequency and magnitude of the sinusoidal waveforms according to the sensed phase current data, the sensed rotor position data, the voltage supplied by the power source, and the torque command signal. In this particular step, generating the electrical control signals includes the step of referring to look-up tables in an electronic memory only when operating the motor in a constant torque mode. Lastly, the method also basically includes the step of utilizing the microcontroller to communicate the switching signals for creating sinusoidal waveforms to the inverter. In this way, the inverter is able to generate sinusoidal waveforms, as dictated by the switching signals received from the microcontroller, from the power supplied by the DC power source. As a result, the inverter is also able to transmit the sinusoidal waveforms to the motor, thereby ultimately controlling the torque of the motor.

According to a preferred embodiment of the method, sensing the phase currents of the motor is preferably accomplished by utilizing current transducers. In addition, sensing the position of the rotor of the motor is preferably accomplished by utilizing an encoder. Furthermore, utilizing the microcontroller to implement a modulation technique is preferably accomplished by specifically implementing a space vector modulation (SVM) technique.

Further according to a preferred embodiment of the method, generating the electrical control signals for adjusting the frequency and magnitude of the sinusoidal waveforms is preferably accomplished by generating a desired value for a first command current variable, wherein the first command current variable controls the flux of the motor, and also generating a desired value for a second command current variable, wherein the second command current variable controls the torque of the motor. Both the first command current variable value and the second command current variable value are based on the sensed rotor position data, the voltage supplied by the power source, and the torque command signal. Once the desired values are generated, the first command current variable value and the second command current variable value are utilized to help generate the electrical control signals for adjusting the frequency and magnitude of the sinusoidal waveforms. Furthermore, generating the electrical control signals is also preferably accomplished by utilizing a current controller to compare the first command current variable value and the second command current variable value with the sensed phase currents of the motor.

When operating the motor in a constant torque mode, referring to look-up tables in an electronic memory to thereby generate the control signals is preferably accomplished by both referring to only two look-up tables and also referring to the look-up tables according to the torque command signal. In a highly preferred embodiment of the method, referring to look-up tables in an electronic memory to thereby generate the control signals is accomplished by generating a desired value for a first command current variable from a first look-up table, wherein the first command current variable controls the flux of the motor, and also generating a desired value for a second command current variable from a second look-up table, wherein the second command current variable controls the torque of the motor. Both the first look-up table and the second look-up table are utilized only when operating the motor in the constant torque mode. Alternatively, when operating the motor in an extended speed mode, generating the electrical control signals is preferably accomplished by generating a desired value for a first command current variable by varying the first command current variable value until the first command current variable value is as high as permitted by the maximum output voltage of the inverter, wherein the first command current variable controls the flux of the motor, and also generating a desired value for a second command current variable as dictated by the first command current variable value and an inherent current limit of the motor, wherein the second command current variable controls the torque of the motor.

The present invention also provides a device for controlling the torque of a permanent magnet (PM), synchronous, alternating-current (AC) motor suitable for an electric vehicle. The motor is powered by an inverter connected to a direct-current (DC) power source, such as a battery. According to the present invention, the device basically includes means for communicating a torque command signal from a user, means for sensing the alternating-current phase currents of the motor and communicating electrical signals representing data concerning the phase currents, and means for sensing the position of the rotor of the motor and communicating electrical signals representing data concerning the position of the rotor. In addition, the device also basically includes an electronic microcontroller unit electrically connected to the torque command signal communication means, the rotor position sensing means, and the phase current sensing means. The microcontroller unit basically includes means for implementing a modulation technique, to generate electrical switching signals for creating electrical sinusoidal waveforms, and for communicating the electrical switching signals to the inverter to thereby transmit sinusoidal waveforms to the motor and thereby control the torque of the motor. The microcontroller unit also basically includes means for implementing a vector control technique to generate electrical control signals for adjusting the frequency and magnitude of the sinusoidal waveforms according to the phase current data, the rotor position data, the voltage supplied by the power source, and the torque command signal. The vector control technique implementation means includes an electronic memory having look-up tables dedicated to generating the electrical control signals only when operating the motor in a constant torque mode.

According to a preferred embodiment of the device, the phase current sensing means comprises current transducers, and the rotor position sensing means comprises an encoder. The microcontroller unit preferably includes a speed calculator unit for calculating the angular speed of the rotor of the motor by receiving pulse train electrical signals from the encoder. The modulation technique implementing means preferably implements a space vector modulation technique.

Advantages, design considerations, and applications of the present invention will become apparent to those skilled in the art when the detailed description of the best mode contemplated for practicing the invention, as set forth hereinbelow, is read in conjunction with the accompanying drawings.

BRIEF DESCRIPTION OF THE DRAWINGS

The present invention will be described, by way of example, with reference to the following drawings.

DESCRIPTION OF THE PREFERRED EMBODIMENT

Figure 1:
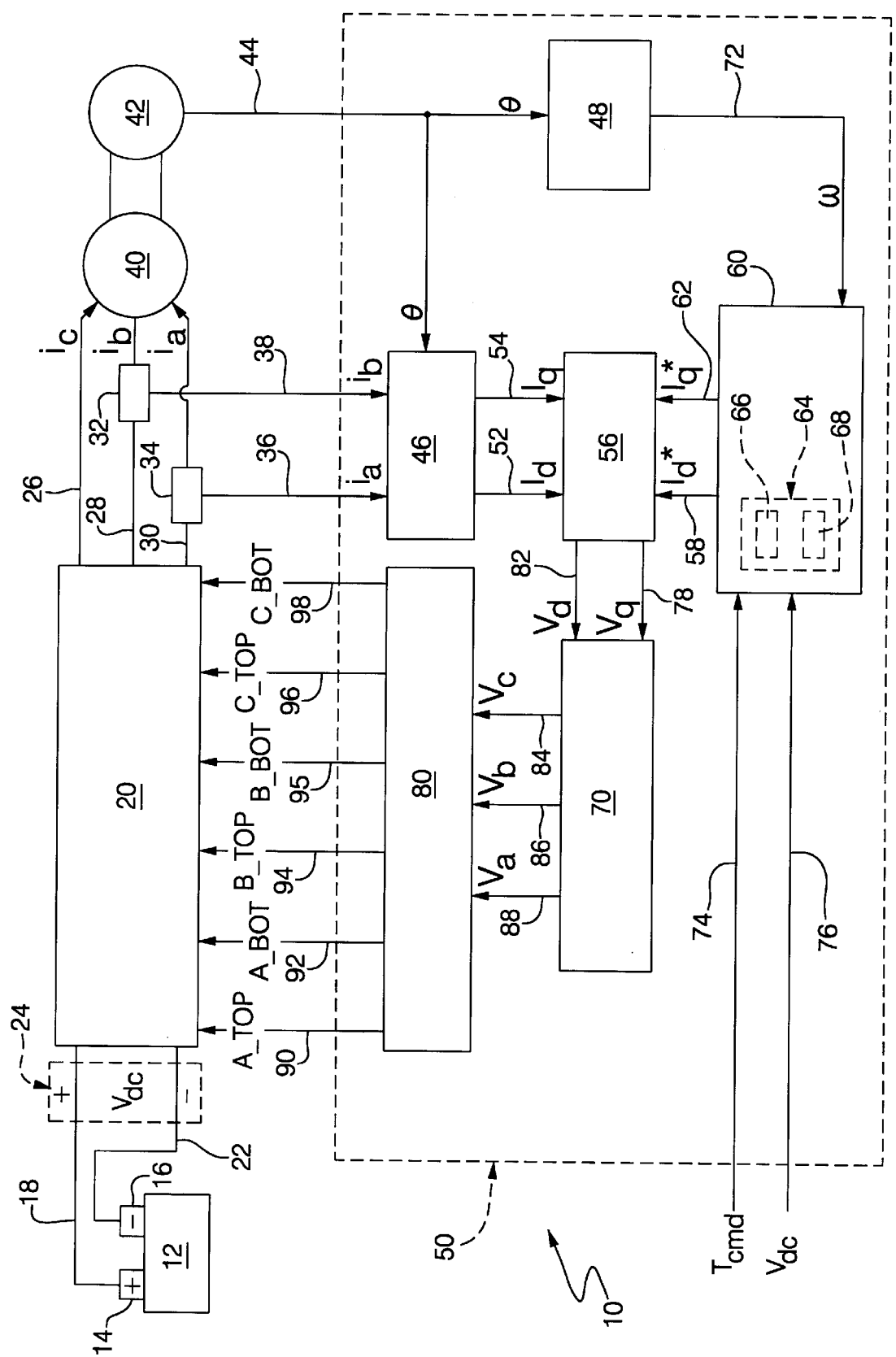
FIG. 1 is a functional block diagram illustrating, according to the present invention, a device for controlling the torque of a permanent magnet (PM), synchronous, alternating-current (AC) motor, wherein the motor is powered by an inverter connected to a direct-current (DC) battery.

FIG. 1 is a functional block diagram illustrating, according to the present invention, a device 10 for controlling the torque of a permanent magnet (PM), synchronous, alternating-current (AC) motor 40. The motor 40 is powered by an inverter 20 connected to a direct-current (DC) power source, in this case a battery 12. More particularly, the battery 12 has a positive terminal 14 and a negative terminal 16. The positive terminal 14 is electrically connected to the inverter 20 via a line 18, and the negative terminal 16 is electrically connected to the inverter 20 via a line 22. The line 18 and the line 22 have a DC voltage potential difference ($V_{dc}$) therebetween and together define a DC power bus 24 which is connected to the inverter 20. The inverter 20 is preferably implemented utilizing MOSFETs (metal-oxide-semiconductor field-effect transistors) due to the high speed switching capability which is characteristic of MOSFETs. However, if the inverter 20 is to accommodate high voltage and current levels, the inverter 20 may instead be of the type which utilizes IGBTs (insulated-gate bipolar transistors), Darlington BJTs (bipolar junction transistors), or thyristors.

The inverter 20 transmits three sinusoidal, alternating-current (AC) phase currents ($i_a$, $i_b$, and $i_c$) to the motor 40 via a line 26, a line 28, and a line 30 for operation and control of the motor 40. For feedback control purposes, the phase currents transmitted to the motor 40 are sensed for determining instantaneous current flows. In the preferred embodiment illustrated in FIG. 1, the phase current $i_a$ on the line 30 is sensed with a first current transducer 34, and the phase current $i_b$ on the line 28 is sensed with a second current transducer 32. Although other types of current sensors can be utilized with the present invention, such as current-sensing resistors, Hall-effect current sensors, and current-sensing transformers, current transducers are preferred for their non-contact current sensing and electrical isolation characteristics as well as their overall easy implementation. Once the phase currents are sensed, digital electrical signals representing data concerning the phase currents are communicated from both the first current transducer 34 and the second current transducer 32 to a microcontroller unit 50.

During operation of the motor 40, the instantaneous angular position of the rotor of the motor 40 is sensed with an encoder 42 for feedback control purposes. According to the present invention, the encoder 42 can be any known type of encoder, such as, for example, a resolver, a rotary encoder, a linear variable differential transformer (LVDT), a rotational variable differential transformer (RVDT), a Hall-effect sensor, an optical encoder (such as a disk with apertures for quadrature sensing), and magneto-resistive sensors. Once the position of the rotor of the motor 40 is sensed, digital electrical signals representing data concerning the position of the rotor are communicated from the encoder 42 to the microcontroller unit 50.

Both data concerning the phase currents and data concerning the position of the rotor of the motor 40 are specifically communicated to a transformation circuit 46 in the microcontroller unit 50 for implementation of a "vector control technique." In particular, data concerning phase current $i_a$ is communicated via a line 36 to the transformation circuit 46, and data concerning phase current $i_b$ is communicated via a line 38 to the transformation circuit 46. Data concerning the position of the rotor is communicated via a line 44 to the transformation circuit 46. The transformation circuit 46 is a conventional three-phase to two-phase transformation circuit, with a-b-c to d-q transformation and a forward vector rotator, wherein the measured values for the AC phase currents, $i_a$ and $i_b$, are converted into values for two DC current components, $I_d$ and $I_q$. The current component $I_d$ is associated with controlling the flux of the motor 40, and the current component $I_q$ is associated with controlling the torque of the motor 40. Once the measured phase currents are converted, the values for the two DC current components are communicated via a line 52 and a line 54 to a current controller circuit 56.

Data concerning the position of the rotor is also specifically communicated to a speed calculator circuit 48 for further implementation of the vector control technique. The speed calculator circuit 48 determines the angular speed of the rotor of the motor 40 by receiving pulse train electrical signals from the encoder 42. The angular speed of the rotor is calculated from the pulse train electrical signals in either of two ways, by measuring the time between pulse edges or by counting the number of pulse edges within a given time period. Once the angular speed of the rotor is calculated by the speed calculator circuit 48, the value for the angular speed is communicated via a line 72 to a command current generator circuit 60.

The command current generator circuit 60 serves to further implement the vector control technique by ultimately generating a preferred value for a first command current $I_d^*$ and a preferred value for a second command current $I_q^*$. The first command current $I_d^*$ is utilized for controlling the flux of the motor 40, and the second command current $I_q^*$ is utilized for controlling the torque of the motor 40. The values generated for the first command current and the second command current are generally based on the angular speed ω of the rotor, the voltage $V_{dc}$ supplied by the battery 12, and a desired motor speed or command torque $T_{cmd}$ communicated by a user (operator). In FIG. 1, the angular speed ω of the rotor is communicated to the command current generator circuit 60 from the speed calculator circuit 48 via the line 72. The command torque $T_{cmd}$ desired by a user is communicated to the command current generator circuit 60 of the microcontroller unit 50 via a line 74. The voltage $V_{dc}$ supplied by the battery 12 is communicated to the to the command current generator circuit 60 of the microcontroller unit 50 via a line 76. The way in which the command current generator circuit 60 generates preferred values for both the first command current $I_d^*$ and the second command current $I_q^*$ is described as follows.

Figure 2:
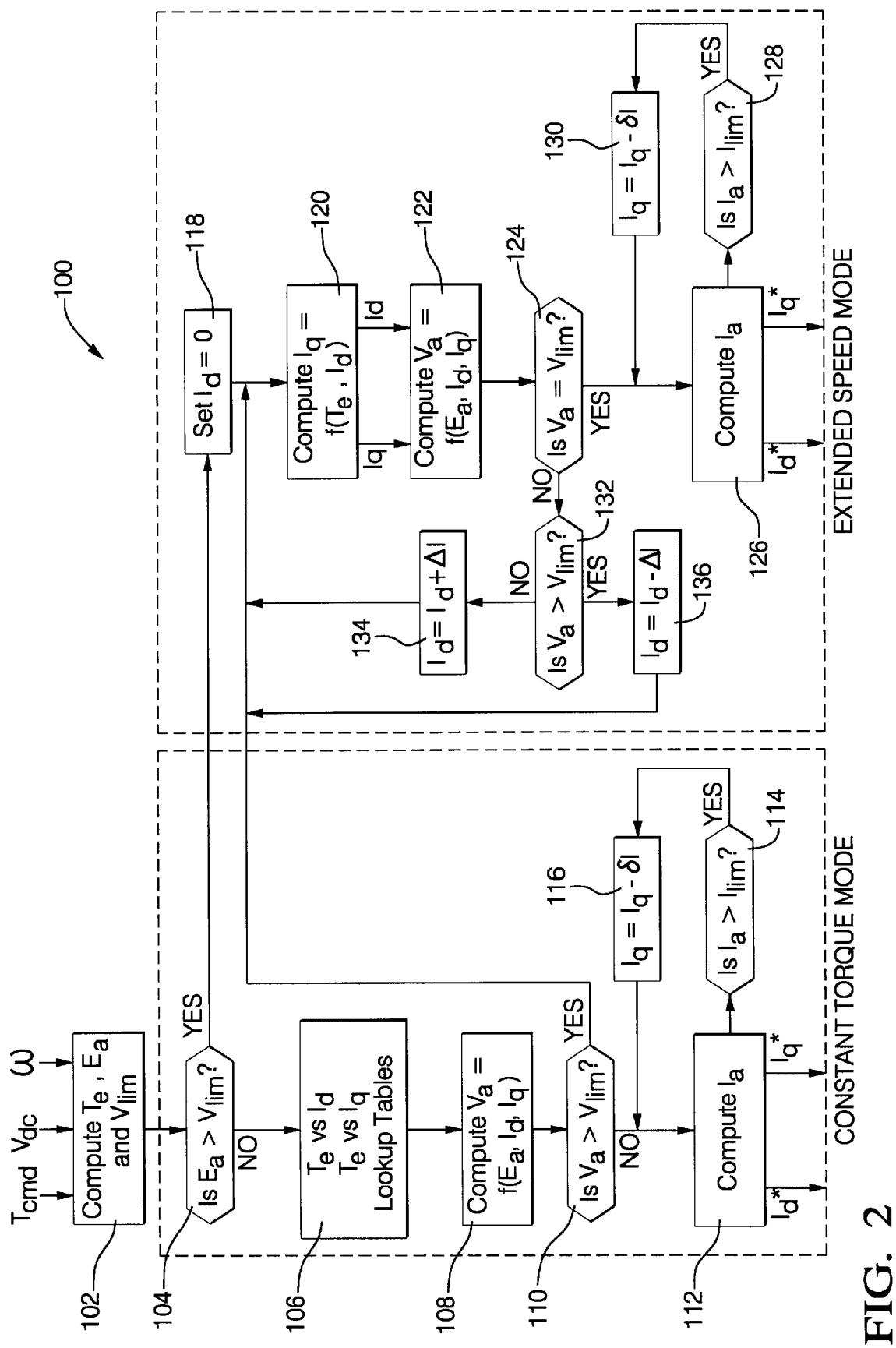
FIG. 2 is a flow diagram illustrating, according to the present invention, method steps for controlling the torque of the motor in FIG. 1.

FIG. 2 is a flow diagram illustrating, according to the present invention, a method 100 for generating preferred values for both the first command current $I_d^*$ and the second command current $I_q^*$ pursuant to implementing the vector control technique for controlling the motor 40. As indicated in a step 102 in FIG. 2, once the command current generator circuit 60 of the microcontroller unit 50 receives values for the angular speed ω of the rotor, the voltage $V_{dc}$ supplied by the battery 12, and a desired motor speed or command torque $T_{cmd}$, values for electromagnetic motor torque $T_e$, motor terminal voltage $E_a$, and maximum inverter output voltage $V_{lim}$ are then determined.

Values for both the motor terminal voltage $E_a$ and the maximum inverter output voltage $V_{lim}$ are determined via conventional methods. First, with regard to the motor terminal voltage $E_a$, the motor terminal voltage $E_a$ is essentially the emf which is induced within the motor 40 during operation of the motor 40. An instantaneous value for $E_a$ is directly and proportionally related to the angular speed (ω) of the rotor of the motor 40 times a known emf constant which is characteristic of the motor 40. Second, with regard to the maximum inverter output voltage $V_{lim}$, a value for $V_{lim}$ is determined from the voltage $V_{dc}$ supplied by the battery 12 and known electrical characteristics which are inherent in the design of the inverter 20.

Figure 3:
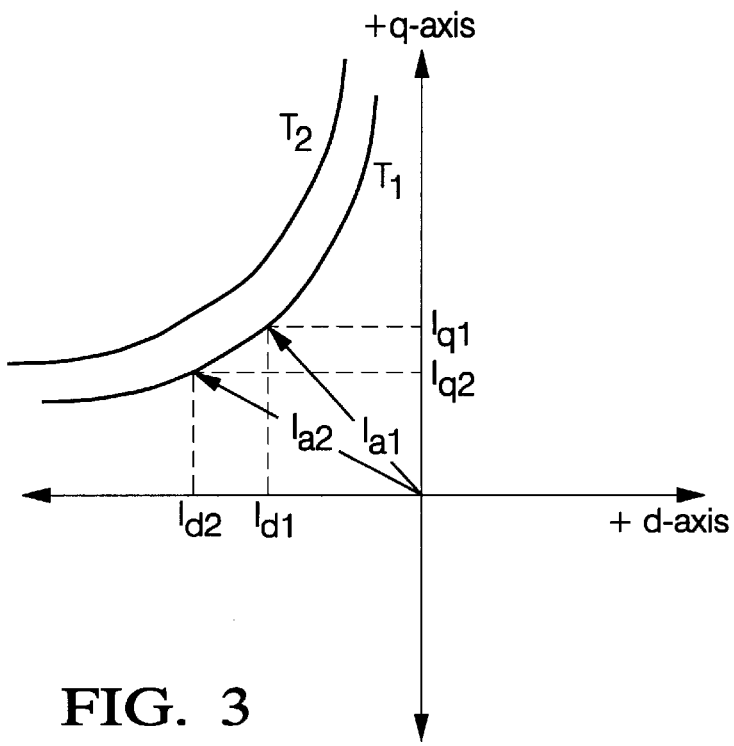
FIG. 3 is a vector diagram illustrating, according to the present invention, two constant torque curves and how to select a minimum phase current vector and associated command currents for a given torque to thereby produce the maximum torque per ampere in a PM, synchronous, AC motor.

With regard to the electromagnetic motor torque $T_e$, since a desired value for the command torque $T_{cmd}$ is provided by a user, a desired value for the motor torque $T_e$ is easily determined by the equation $$T_e = (T_{cmd})/(\text{gear ratio})$$

where the motor torque $T_e$ is defined as $$T_e = 3(p)(I_q)[\Psi_f + (L_d - L_q)(I_d)],$$

wherein p is a pole pair, $I_q$ is a quadrature-axis command current, $\Psi_f$ is magnetic flux linkages, $L_d$ is a direct-axis inductance, $L_q$ is a quadrature-axis inductance, and $I_d$ is a direct-axis command current. This equation for $T_e$ can be alternatively expressed in a per unit value as $$T_{ep} = (I_{qp})(1 - I_{dp})$$

where $T_{ep} = T_e/T_b$,
$I_{dp} = I_d/I_b$,
$I_{qp} = I_q/I_b$,
$I_b = (\Psi_f)/(L_q - L_d)$,
and $$T_b = 3(p)(\Psi_f)(I_b),$$

wherein $T_{ep}$ is the per unit air gap torque, $I_{dp}$ is the per unit direct-axis command current, $I_{qp}$ is the per unit quadrature-axis command current, and $I_b$ is a base current. As illustrated in FIG. 3 for background purposes, since it is possible to have many different phase current vectors (such as $I_{a1}$ with its associated command current components $I_{d1}$ and $I_{q1}$, or $I_{a2}$ with its associated command current components $I_{d2}$ and $I_{q2}$) satisfying a desired motor torque $T_e$ (such as desired motor torque $T_1$) because a constant torque locus in a d-q coordinate system is a hyperbola (when neglecting saturation), the minimum phase current vector should ideally then be selected for purposes of ultimately deriving values for both command currents $I_d^*$ and $I_q^*$ in order to attain maximum torque-per-ampere control of the motor 40. For example, in the case particularly illustrated in FIG. 3, values for command currents $I_d^*$ and $I_q^*$ should preferably be derived from phase current vector $I_{a1}$ instead of from phase current vector $I_{a2}$, since phase current vector $I_{a1}$ defines a shorter vector length from the origin to the desired torque $T_1$ hyperbola than does $I_{a2}$. In this way, maximum torque-per-ampere for a given desired torque is ensured. In light of such, optimum values for command currents $I_d^*$ and $I_q^*$ that will produce the maximum torque-per-ampere for a given torque $T_e$ can be determined from the equations $$T_{ep}=T_e/T_b,$$

$$T_{ep}=\sqrt{(I_{dp}^*)(I_{dp}^*-1)^3},$$

and $$T_{ep}=0.5(I_{qp})\{1+\sqrt{(I_{dp}^*)(4I_{qp}^*+1)^2}\}$$

where $$I_d^*=(I_{dp}^*)(I_b)$$

and $$I_q^*=(I_{qp}^*)(I_b).$$

Further in FIG. 2, once values for the motor torque $T_e$, the terminal voltage $E_a$, and the maximum inverter output voltage $V_{lim}$ are determined in the step 102, the terminal voltage $E_a$ and the maximum inverter output voltage $V_{lim}$ are compared with each other in a step 104. The comparison made in the step 104 is used to determine whether the motor 40 is operating in a constant torque mode at or below the rated base speed of the motor 40 or whether the motor 40 is operating in an extended speed mode (that is, a "field-weakening" region) above the rated base speed of the motor 40. If the terminal voltage $E_a$ is determined to be greater than the maximum inverter output voltage $V_{lim}$, then the motor 40 is determined to be operating in the extended speed mode. If, on the other hand, the terminal voltage $E_a$ is instead determined to be no greater than the maximum inverter output voltage $V_{lim}$, then the motor 40 is determined to be operating in the constant torque mode.

For operating in the constant torque mode as determined in the step 104, a step 106 dictates that preliminary values for the first command current $I_d$ and the second command current $I_q$ are obtained from an electronic memory 64 associated with the command current generator circuit 60 of the microcontroller unit 50. The memory 64 has a first look-up table 66, dedicated to providing a value for the first command current $I_d$, and a second look-up table 68, dedicated to providing a value for the second command current $I_q$. Specific values are pre-referenced and pre-stored in both the first look-up table 66 and the second look-up table 68 according to torque values. In this way, specific preliminary values for both the first command current $I_d$ and the second command current $I_q$ are easily "looked up" and obtained from the look-up tables 66 and 68 based on the value of the motor torque $T_e$, as determined from $T_{cmd}$ in the step 102. The preliminary values for $I_d$ and $I_q$ obtained from the look-up tables for a given motor torque $T_e$ are specifically predetermined such that the motor 40 attains a maximum torque-per-ampere. As a result, the computational complexity and processing time associated with implementing many of the equations alluded to earlier hereinabove is greatly reduced according to the present invention when operating the motor 40 in the constant torque mode.

Once preliminary values for $I_d$ and $I_q$ are obtained from the look-up tables in the step 106, a motor phase voltage $V_a$ is determined in a step 108. According to the step 108, the phase voltage $V_a$ is calculated with the equation $$V_a^2=[(E_a)+(\omega)(L_d)(I_d)+R(I_q)]^2+[R(I_d)-(\omega)(L_q)(I_q)]^2,$$

wherein $\omega$ is the angular speed of the rotor, and R is the phase or stator resistance. After the step 108, the phase voltage $V_a$ is compared with the maximum inverter output voltage $V_{lim}$ in a step 110 to determine whether the motor 40 is to be operating in a constant torque mode below base speed or whether the motor 40 is to be operating in an extended speed mode (that is, a "field-weakening" region) above base speed. If the phase voltage $V_a$ is determined to be greater than the maximum inverter output voltage $V_{lim}$, then the motor 40 is determined to be operating in the extended speed mode. If, on the other hand, the phase voltage $V_a$ is instead determined to be no greater than the maximum inverter output voltage $V_{lim}$, then the motor 40 is still determined to be operating in the constant torque mode.

For operating in the constant torque mode as determined in the step 110, a phase current $I_a$ is conventionally determined in a d-q coordinate system based on the preliminary values for the first command current $I_d$ and the second command current $I_q$ in a step 112. If the phase current $I_a$ is thereafter determined to be greater than a predetermined inherent current limit $I_{lim}$ of the motor 40 in a step 114, the preliminary value for the second command current $I_q$ is then adjusted (reduced) in a step 116, and the step 112 is thereafter repeated wherein the value for the phase current $I_a$ is redetermined with the adjusted value for the second command current $I_q$. Once the phase current $I_a$ is determined to be no greater than the predetermined current limit $I_{lim}$ of the motor 40, the values for the first command current $I_d$ and the second command current $I_q$ are deemed optimal. As such, the values are transmitted as preferred (or reference) values for the first command current $I_d^*$ and the second command current $I_q^*$ from the command current generator circuit 60 of the microcontroller unit 50 to the current controller circuit 56. As illustrated in FIG. 1, the first command current $I_d^*$ is transmitted via a line 58, and the second command current $I_q^*$ is transmitted via a line 62.

For operating in the extended speed mode as determined in the step 104, a preliminary value of zero is initially assigned to the first command current $I_d$ in a step 118 before a step 120 is executed. For operating in the extended speed mode as determined in the step 110, the particular preliminary value generated and assigned to the first command current $I_d$ from the first look-up table 66 in the step 106 is retained before the step 120 is executed.

For operating the motor 40 in the extended speed mode, a preliminary value for the second command current $I_q$ is determined in the step 120 from the equation $$I_q=(T_e)/\{3(p)[\Psi_f+(L_d-L_q)(I_d)]\}.$$

Once a preliminary value for the second command current $I_q$ is determined in the step 120, a value for the phase voltage $V_a$ is determined in a step 122 with the equation $$V_a^2=[(E_a)+(\omega)(L_d)(I_d)+R(I_q)]^2+[R(I_d)-(\omega)(L_q)(I_q)]^2.$$

Once the phase voltage $V_a$ is determined in the step 122, the phase voltage $V_a$ is then compared with the maximum inverter output voltage $V_{lim}$ in a step 124. Based on the comparison, if the phase voltage $V_a$ is determined to be substantially unequal to the maximum inverter output voltage $V_{lim}$, then a step 132 is thereafter executed. If, on the other hand, the phase voltage $V_a$ is determined to be substantially equal to the maximum inverter output voltage $V_{lim}$, then a step 126 is instead thereafter executed.

If the phase voltage $V_a$ is determined to be substantially unequal to the maximum inverter output voltage $V_{lim}$ in the step 124, then the phase voltage $V_a$ is compared with the maximum inverter output voltage $V_{lim}$ in a step 132 to determine whether the phase voltage $V_a$ is greater than the maximum inverter output voltage $V_{lim}$. If the phase voltage $V_a$ is determined to be greater, then the preliminary value for the first command current $I_d$ is reduced (adjusted) in a step 136, and values for the second command current $I_q$ and the phase voltage $V_a$ are thereafter redetermined according to the steps 120 and 122 before the phase voltage $V_a$ is again compared with the maximum inverter output voltage $V_{lim}$ in the step 124. If, on the other hand, the phase voltage $V_a$ is determined to be less than the maximum inverter output voltage $V_{lim}$, then the preliminary value for the first command current $I_d$ is increased (adjusted) in a step 134, and values for the second command current $I_q$ and the phase voltage $V_a$ are thereafter redetermined according to the steps 120 and 122 before the phase voltage $V_a$ is again compared with the maximum inverter output voltage $V_{lim}$ in the step 124.

Figure 4:
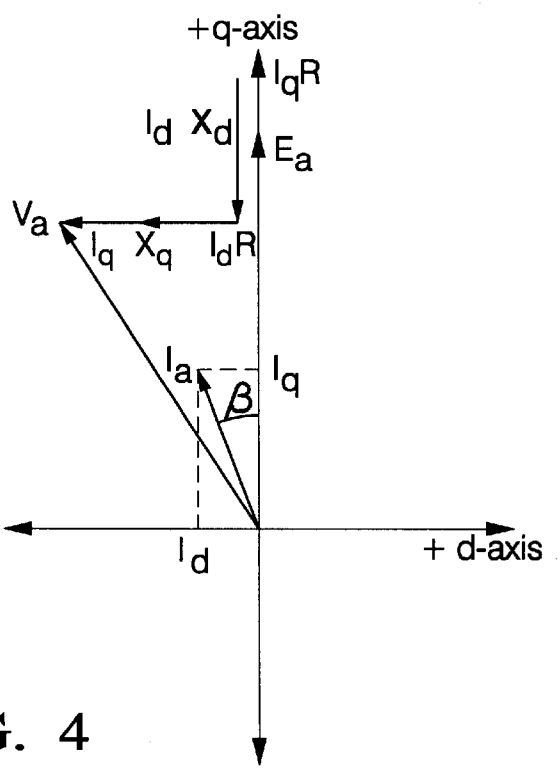
FIG. 4 is a vector diagram illustrating, according to the present invention, how the phase current and the phase voltage of a PM, synchronous, AC motor can be mapped as a vector onto a two-axis (d-q) coordinate system to achieve decoupled control of the flux and torque of the motor in an extended speed mode.

If or when the phase voltage $V_a$ is determined to be substantially equal to the maximum inverter output voltage $V_{lim}$ in the step 124, then the phase current $I_a$ is conventionally determined in a d-q coordinate system, as illustrated in FIG. 4, in a step 126. As particularly illustrated in FIG. 4, the phase current $I_a$, along with its associated phase voltage $V_a$, is based on the preliminary values for the first command current $I_d$ and the second command current $I_q$, wherein $\beta$ (beta) is the stator current phase angle, $X_d$ is the d-axis stator leakage reactance, and $X_q$ is the q-axis stator leakage reactance. If the phase current $I_a$ is thereafter determined to be greater than a predetermined inherent current limit $I_{lim}$ of the motor 40 in a step 128, the preliminary value for the second command current $I_q$ is then reduced (adjusted) in a step 130, and the step 126 is thereafter repeated wherein the value for the phase current $I_a$ is redetermined with the adjusted value for the second command current $I_q$. Once the phase current $I_a$ is determined to be no greater than the predetermined current limit $I_{lim}$ of the motor 40, the values for the first command current $I_d$ and the second command current $I_q$ are deemed optimal. As such, the values are transmitted as preferred (or reference) values for the first command current $I_d^*$ and the second command current $I_q^*$ from the command current generator circuit 60 of the microcontroller unit 50 to the current controller circuit 56. As illustrated in FIG. 1, the first command current $I_d^*$ is transmitted via the line 58, and the second command current $I_q^*$ is transmitted via the line 62.

At this point, it is fitting to highlight the effects of utilizing the method steps set forth in FIG. 2 for generating preferred values for the first command current $I_d^*$ and the second command current $I_q^*$. For operating the motor 40 in the constant torque mode below base speed, preliminary values for both the first command current $I_d$ and the second command current $I_q$ are pre-stored in only two look-up tables 66 and 68, are referenced according to a given torque $T_e$, and are ultimately obtained. The preliminary values pre-stored in the two look-up tables 66 and 68 are carefully predetermined so as to produce maximum torque-per-ampere when control of the motor 40 is ultimately dictated by the values of the first command current $I_d^*$ and the second command current $I_q^*$. In this way, the computational complexity associated with the implementation of complex mathematical equations and the associated processing time is advantageously eliminated and/or minimized. For operating the motor 40 in the extended speed mode above base speed (in the field-weakening region), values for the first command current $I_d^*$ and the second command current $I_q^*$ are specifically determined with simple equations wherein an optimal value for the first command current $I_d^*$ is first determined for a given torque command $T_{cmd}$ and measured angular speed $\omega$ of the rotor of the motor 40. More particularly, since the first command current $I_d^*$ is associated with specific control of the flux of the motor 40 and since the second command current $I_q^*$ is associated with specific control of the torque of the motor 40, the first command current $I_d$ is purposely initialized at zero (step 118) and is minimally adjusted (steps 134 and 136) only as needed so as to obtain a value for the second command current $I_q$ which will produce optimal torque. In an ideal case, the optimal mode of operation at which the motor 40 produces the maximum amount of torque is attained when the first command current $I_d$ is equal to zero. However, as FIG. 4 particularly illustrates according to the present invention, optimal values for the first command current $I_d$ are always negative when the motor 40 operates in the extended speed mode.

In FIG. 1, after the "measured" values for the first current component $I_d$ and the second current component $I_q$ and the "preferred" values (reference values) for the first command current $I_d^*$ and the second command current $I_q^*$ are all generated and communicated to the current controller circuit 56, the current controller circuit 56 further implements the vector control technique by comparing the measured values with the preferred values. Based on the comparison, the current controller circuit 56 generates electrical control signals (that is, adjustment or correction signals) in the form of DC output voltages designated $V_d$ and $V_q$. According to the present invention, the current controller circuit 56 preferably comprises two conventional PI (proportional integral) controller circuits, one for comparing $I_d$ with $I_d^*$ and another one for comparing $I_q$ with $I_q^*$. The output voltages $V_d$ and $V_q$ serve as feedback control signal variables which are generated and adjusted over time to help bring about conformity and substantially zero error between future measured and preferred values. With respect to the microcontroller unit 50, the two PI controller circuits of the current controller circuit 56 are essentially microelectronic implementations of mathematical difference equations.

Once the control signals $V_d$ and $V_q$ are determined by the current controller circuit 56, the control signals are communicated to a transformation circuit 70 via a line 82 and a line 78. The transformation circuit 46 is a conventional two-phase to three-phase transformation circuit, with a reverse vector rotator and d-q to a-b-c transformation, wherein the DC values for the control signals $V_d$ and $V_q$ are converted into control signals $v_a$, $v_b$, and $v_c$. Once the control signals $v_a$, $v_b$, and $v_c$ are determined, the control signals are then communicated via a line 88, a line 86, and a line 84 to a modulation circuit 80 for implementing a modulation technique.

The modulation circuit 80 implements a modulating technique to generate electrical switching signals for helping the inverter 20 create sinusoidal waveforms (phase currents) which are ultimately transmitted to the motor 40. The switching signals, designated as A_TOP, A_BOT, B_TOP, B_BOT, C_TOP, and C_BOT in FIG. 1, dictate the conductive states of the six power switches in the inverter 20. The switching signals are communicated from the modulation circuit 80 of the microcontroller unit 50 to the inverter 20 via a line 90, a line 92, a line 94, a line 95, a line 96, and a line 98. Although many different modulation techniques may be implemented with the present invention, the modulation circuit 80 preferably implements a space vector modulation (SVM) technique. The reason for such is because a SVM technique utilizes more of the DC power bus 24 than do other techniques. In addition, a SVM technique can often reduce current ripple, offer lower switching losses, and yield better overall harmonic performance and alignment to digital control techniques. The control signals $v_a$, $v_b$, and $v_c$ communicated to the modulation circuit 80 serve as feedback control signals which help the modulation circuit 80 generate appropriate electrical switching signals so that both the frequency and the magnitude of the sinusoidal waveforms created by the inverter 20 are precisely tuned for producing an optimal motor torque.

While the present invention has been described in what is presently considered to be the most practical and preferred embodiment and/or implementation, it is to be understood that the invention is not to be limited to the disclosed embodiment, but on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for controlling the torque of a permanent magnet synchronous motor wherein said motor is powered by an inverter connected to a direct-current power source, said method comprising the steps of:

communicating a torque command signal from a user to a microcontroller;

sensing the alternating-current phase currents of said motor and communicating electrical signals representing data concerning said phase currents to said microcontroller;

sensing the position of the rotor of said motor and communicating electrical signals representing data concerning said position of said rotor to said microcontroller;

utilizing said microcontroller to implement a modulation technique to generate electrical switching signals for creating electrical sinusoidal waveforms;

utilizing said microcontroller to implement a vector control technique to generate electrical control signals for adjusting the frequency and magnitude of said sinusoidal waveforms according to said phase current data, said rotor position data, the voltage supplied by said power source, and said torque command signal, wherein generating said control signals includes the step of referring to look-up tables in an electronic memory when operating said motor in a constant torque mode to thereby generate said control signals; and utilizing said microcontroller to communicate said switching signals for creating sinusoidal waveforms to said inverter to thereby transmit sinusoidal waveforms to said motor and thereby control the torque of said motor.

2. The method according to claim 1, wherein the step of sensing the phase currents of said motor includes the step of utilizing current transducers to sense said phase currents.

3. The method according to claim 1, wherein the step of sensing the position of the rotor of said motor includes the step of utilizing an encoder to sense said position of said rotor of said motor.

4. The method according to claim 3, wherein the step of utilizing said microcontroller to implement a vector control technique includes the step of determining the angular speed of said rotor of said motor by receiving pulse train electrical signals from said encoder.

5. The method according to claim 1, wherein the step of utilizing said microcontroller to implement a modulation technique includes the step of implementing a space vector modulation technique.

6. The method according to claim 1, wherein generating electrical control signals includes the steps of:

generating a desired value for a first command current variable, wherein said first command current variable controls the flux of said motor; and generating a desired value for a second command current variable, wherein said second command current variable controls the torque of said motor;

basing said first command current variable value and said second command current variable value on said rotor position data, said voltage supplied by said power source, and said torque command signal; and utilizing said first command current variable value and said second command current variable value to generate said electrical control signals for adjusting the frequency and magnitude of said sinusoidal waveforms.

7. The method according to claim 6, wherein generating electrical control signals includes the step of utilizing a current controller to compare said first command current variable value and said second command current variable value with said sensed phase currents of said motor.

8. The method according to claim 1, wherein the step of referring to look-up tables in an electronic memory includes the step of referring to only two look-up tables to thereby generate said control signals.

9. The method according to claim 1, wherein the step of referring to look-up tables in an electronic memory includes the step of referring to look-up tables according to said torque command signal to thereby generate said control signals.

10. The method according to claim 1, wherein the step of referring to look-up tables in an electronic memory includes the steps of:

generating a desired value for a first command current variable from a first look-up table, wherein said first command current variable controls the flux of said motor;

generating a desired value for a second command current variable from a second look-up table, wherein said second command current variable controls the torque of said motor;

utilizing said first look-up table and said second look-up table only when operating said motor in a constant torque mode; and utilizing said first command current variable value and said second command current variable value to generate said electrical control signals for adjusting the frequency and magnitude of said sinusoidal waveforms.

11. The method according to claim 1, wherein generating electrical control signals, when operating said motor in an extended speed mode, includes the steps of:

generating a desired value for a first command current variable by varying said first command current variable value until said first command current variable value is as high as permitted by the maximum output voltage of said inverter, wherein said first command current variable controls the flux of said motor;

generating a desired value for a second command current variable as dictated by said first command current variable value and an inherent current limit of said motor, wherein said second command current variable controls the torque of said motor; and utilizing said first command current variable value and said second command current variable value to generate said electrical control signals for adjusting the frequency and magnitude of said sinusoidal waveforms.

12. A method for controlling the torque of a permanent magnet synchronous motor wherein said motor is powered by an inverter connected to a direct-current power source, said method comprising the steps of:

communicating a torque command signal from a user to a microcontroller;

utilizing current transducers to sense the alternating-current phase currents of said motor;

communicating electrical signals representing data concerning said phase currents to said microcontroller;

utilizing an encoder to sense the position of the rotor of said motor;

communicating pulse train electrical signals representing data concerning said position of said rotor to said microcontroller;

utilizing said microcontroller to determine the angular speed of said rotor of said motor from said pulse train electrical signals received from said encoder;

utilizing said microcontroller to implement a modulation technique to generate electrical switching signals for creating electrical sinusoidal waveforms;

utilizing said microcontroller to implement a vector control technique to generate electrical control signals for adjusting the frequency and magnitude of said sinusoidal waveforms according to said phase current data, said rotor position data, the voltage supplied by said power source, and said torque command signal; and utilizing said microcontroller to communicate said switching signals for creating sinusoidal waveforms to said inverter to thereby transmit sinusoidal waveforms to said motor and thereby control the torque of said motor;

wherein the step of utilizing said microcontroller to implement a vector control technique includes the steps of:

(1) determining a motor torque, a terminal voltage, and a maximum inverter output voltage based on said command torque signal, said voltage supplied by said power source, and said angular speed of said rotor;

(2) comparing said terminal voltage with said maximum inverter output voltage;

(3) if said terminal voltage is greater than said maximum inverter output voltage, skipping steps (4) through (8) and thereafter executing step (9);

(4) obtaining a desired value for a first command current variable and a value for a second command current variable from look-up tables stored in an electronic memory according to said motor torque, wherein said first command current variable controls the flux of said motor, and wherein said second command current variable controls the torque of said motor;

(5) determining a phase voltage based on said terminal voltage, said first command current variable value, and said second command current variable value;

(6) comparing said phase voltage with said maximum inverter output voltage;

(7) if said phase voltage is greater than said maximum inverter output voltage, skipping steps (8) and (9) and thereafter executing step (10);

(8) if said phase voltage is no greater than said maximum inverter output voltage, skipping steps (9) through (15) and thereafter executing step (16);

(9) setting a desired value for a first command current variable equal to zero;

(10) determining a desired value for a second command current variable based on said motor torque and said first command current variable value;

(11) determining a phase voltage based on said terminal voltage, said first command current variable value, and said second command current variable value;

(12) comparing said phase voltage with said maximum inverter output voltage;

(13) if said phase voltage is less than said maximum inverter output voltage, increasing said first command current variable value and repeating steps (10) through (12);

(14) if said phase voltage is greater than said maximum inverter output voltage, decreasing said first command current variable value and repeating steps (10) through (12);

(15) if said phase voltage is substantially equal to said maximum inverter output voltage, executing step (16);

(16) determining a phase current based on said first command current variable value and said second command current variable value;

(17) if said phase current is greater than an inherent current limit of said motor, reducing said second command current variable value and repeating steps (16) and (17); and

(18) utilizing said first command current variable value and said second command current variable value to generate electrical control signals for adjusting the frequency and magnitude of said sinusoidal waveforms.

13. A device for controlling the torque of a permanent magnet synchronous motor wherein said motor is powered by an inverter connected to a direct-current power source, said device comprising:

means for communicating a torque command signal from a user;

means for sensing the alternating-current phase currents of said motor and communicating electrical signals representing data concerning said phase currents;

means for sensing the position of the rotor of said motor and communicating electrical signals representing data concerning said position of said rotor; and an electronic microcontroller unit electrically connected to said torque command signal communication means, said rotor position sensing means, and said phase current sensing means, said microcontroller unit including;

means for implementing a modulation technique, to generate electrical switching signals for creating electrical sinusoidal waveforms, and for communicating said electrical switching signals to said inverter to thereby transmit sinusoidal waveforms to said motor and thereby control the torque of said motor; and means for implementing a vector control technique to generate electrical control signals for adjusting the frequency and magnitude of said sinusoidal waveforms according to said phase current data, said rotor position data, the voltage supplied by said power source, and said torque command signal, wherein said vector control technique implementation means includes an electronic memory having look-up tables dedicated to generating said control signals when operating said motor in a constant torque mode.

14. The device according to claim 13, wherein said phase current sensing means comprises current transducers.

15. The device according to claim 13, wherein said rotor position sensing means comprises an encoder.

16. The device according to claim 15, wherein said microcontroller unit includes means for calculating the angular speed of said rotor of said motor by receiving pulse train electrical signals from said encoder.

17. The device according to claim 13, wherein said modulation technique is a space vector modulation technique.

18. The device according to claim 13, wherein said vector control technique implementing means includes:

means for generating a desired value for a first command current variable, wherein said first command current variable controls the flux of said motor; and means for generating a desired value for a second command current variable, wherein said second command current variable controls the torque of said motor;

wherein said first command current variable value and said second command current variable value are based on said rotor position data, said voltage supplied by said power source, and said torque command signal; and wherein said first command current variable value and said second command current variable value are utilized to generate said electrical control signals for adjusting the frequency and magnitude of said sinusoidal waveforms.

19. The device according to claim 18, wherein said vector control technique implementing means includes a current controller for comparing said first command current variable value and said second command current variable value with said sensed phase currents of said motor.

20. The device according to claim 13, wherein said vector control technique implementing means includes an electronic memory having only two look-up tables dedicated to generating said control signals.

21. The device according to claim 13, wherein said electronic memory comprises:

a first look-up table for generating a desired value for a first command current variable, wherein said first command current variable controls the flux of said motor; and a second look-up table for generating a desired value for a second command current variable, wherein said second command current variable controls the torque of said motor;

wherein said first look-up table and said second look-up table are utilized only when operating said motor in a constant torque mode; and wherein said first command current variable value and said second command current variable value are utilized to generate said electrical control signals for adjusting the frequency and magnitude of said sinusoidal waveforms.

22. The device according to claim 13, wherein said vector control technique implementing means includes:

means for generating a desired value for a first command current variable by varying said first command current variable value until said first command current variable value is as high as permitted by the maximum output voltage of said inverter, wherein said first command current variable controls the flux of said motor; and means for generating a desired value for a second command current variable as dictated by said first command current variable value and an inherent current limit of said motor, wherein said second command current variable controls the torque of said motor;

wherein said first command current variable value generating means and said second command current variable value generating means are utilized only when operating said motor in an extended speed mode; and wherein said first command current variable value and said second command current variable value are utilized to generate the electrical control signals for adjusting the frequency and magnitude of said sinusoidal waveforms.

* * * * *